United States Patent [19]

Reunamäki et al.

[11] Patent Number: 4,695,821

[45] Date of Patent: Sep. 22, 1987

[54] RESISTOR ELEMENT ASSEMBLY FOR A HEATING FURNACE OF GLASS SHEETS AND METHOD OF REPLACING A RESISTOR ELEMENT

[75] Inventors: Pauli T. Reunamäki, Nattari; Erkki P. J. Yli-Vakkuri; Kauko K. Anttonen, both of Tampere, all of Finland

[73] Assignee: O/Y Kyro A/B Tamglass, Tampere, Finland

[21] Appl. No.: 809,341

[22] Filed: Dec. 16, 1985

[30] Foreign Application Priority Data

Jan. 3, 1985 [FI] Finland ................................. 850026

[51] Int. Cl.$^4$ ........................................... H01C 10/16
[52] U.S. Cl. .................................. 338/316; 219/550; 29/762; 29/426.5
[58] Field of Search .................. 338/316, 315, 209; 219/534, 550; 29/762, 426.5

[56] References Cited

U.S. PATENT DOCUMENTS

| | | | |
|---|---|---|---|
| 1,715,018 | 5/1929 | Von Brockdorff | 338/316 X |
| 1,884,232 | 10/1932 | Rehm | 219/534 X |
| 2,571,422 | 10/1951 | Cole et al. | 338/316 X |
| 3,217,279 | 11/1965 | Boggs | 219/550 X |
| 3,387,116 | 6/1968 | Dupuis | 338/316 X |
| 3,846,621 | 11/1974 | Roos | 219/550 |
| 4,401,883 | 8/1983 | Watson | 338/316 X |
| 4,464,565 | 8/1984 | Spangler | 338/316 X |
| 4,475,030 | 10/1984 | Bailey | 338/316 X |

FOREIGN PATENT DOCUMENTS 8102131 11/1981 Netherlands .................. 219/550

Primary Examiner—Nicholas P. Godici
Assistant Examiner—Carmine Cuda
Attorney, Agent, or Firm—Burns, Doane, Swecker & Mathis

[57] ABSTRACT

The invention relates to a resistor element assembly for a glass sheet heating furnace and to a method of replacing a resistor element. A resistor element is built by placing successively in longitudinal direction ceramic elements, with a resistance wire wound therearound. Between the ceramic elements are fitted ceramic spacer blocks whose diameter exceeds that of the resistance wire coils. The resistor element is carried by a support frame upon the spacer blocks. A problem to be resolved is to provide a long resistor element, wherein the major variations in length between the components of various materials caused by major temperature variations do not produce deformations in resistance wires. This problem has been resolved by fitting between one end of the support frame and the corresponding end of the resistor element a tensioned spring which compresses the resistor element at all operating temperatures against a limit stop at the other end of the support frame. The resistor element can be replaced by releasing said spring from the support frame and by pulling the resistor element out of a furnace by utilizing a core pin extending through the entire resistor element, whereby the ceramic elements remain subjected to compression stress. By using an auxiliary spring between the end of said core pin and the end of said resistor element, the compression holding the resistor element together can be maintained also during transportation and installation.

6 Claims, 9 Drawing Figures

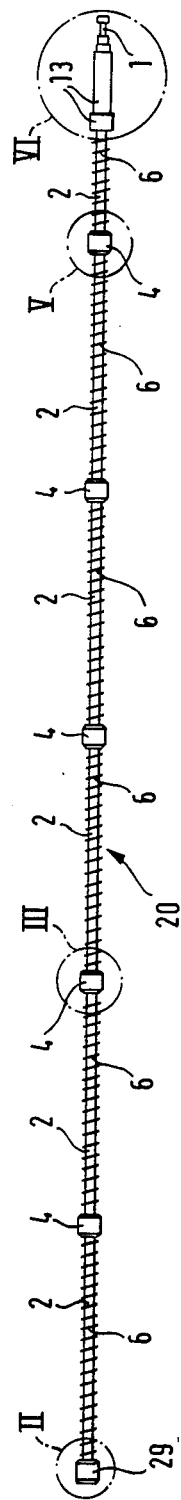
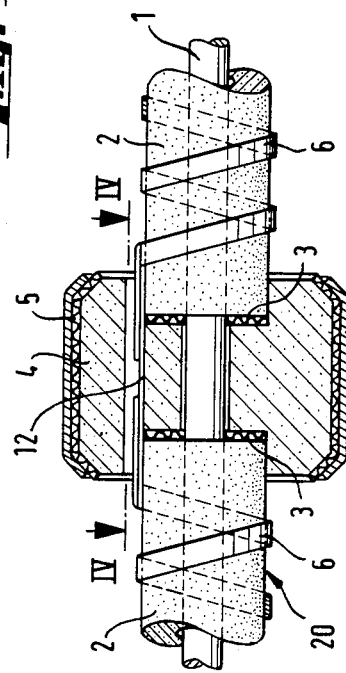
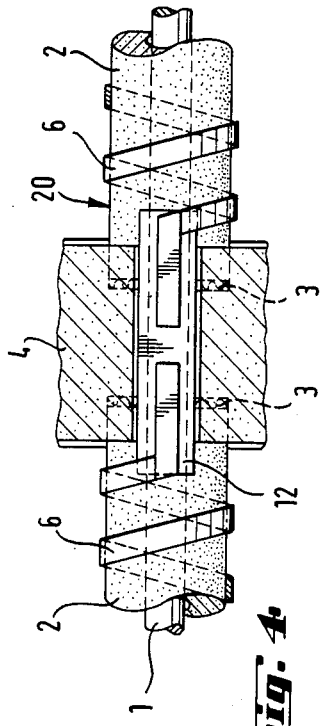
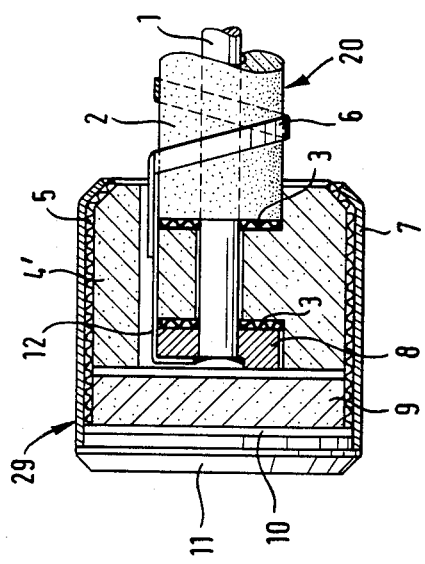

U.S. Patent  Sep. 22, 1987  Sheet 2 of 3  4,695,821
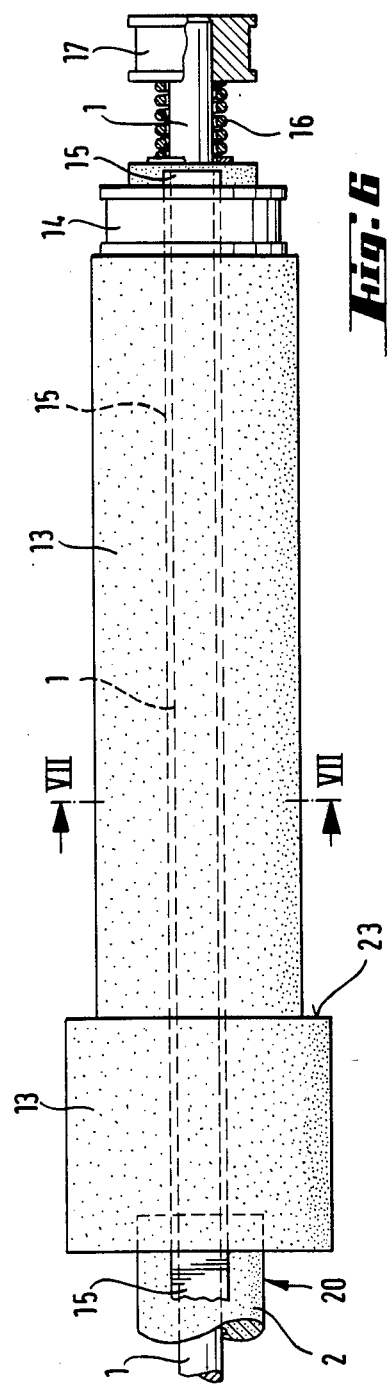
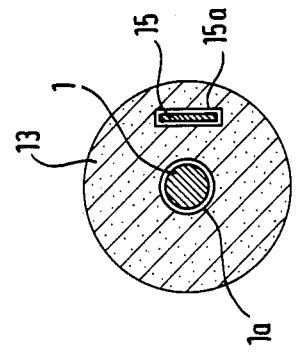
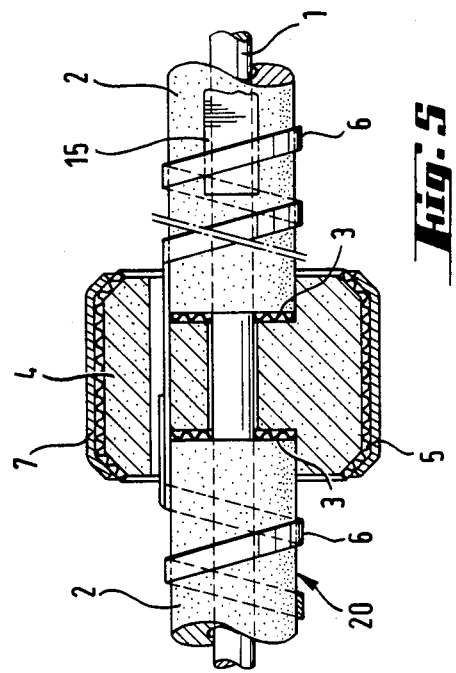

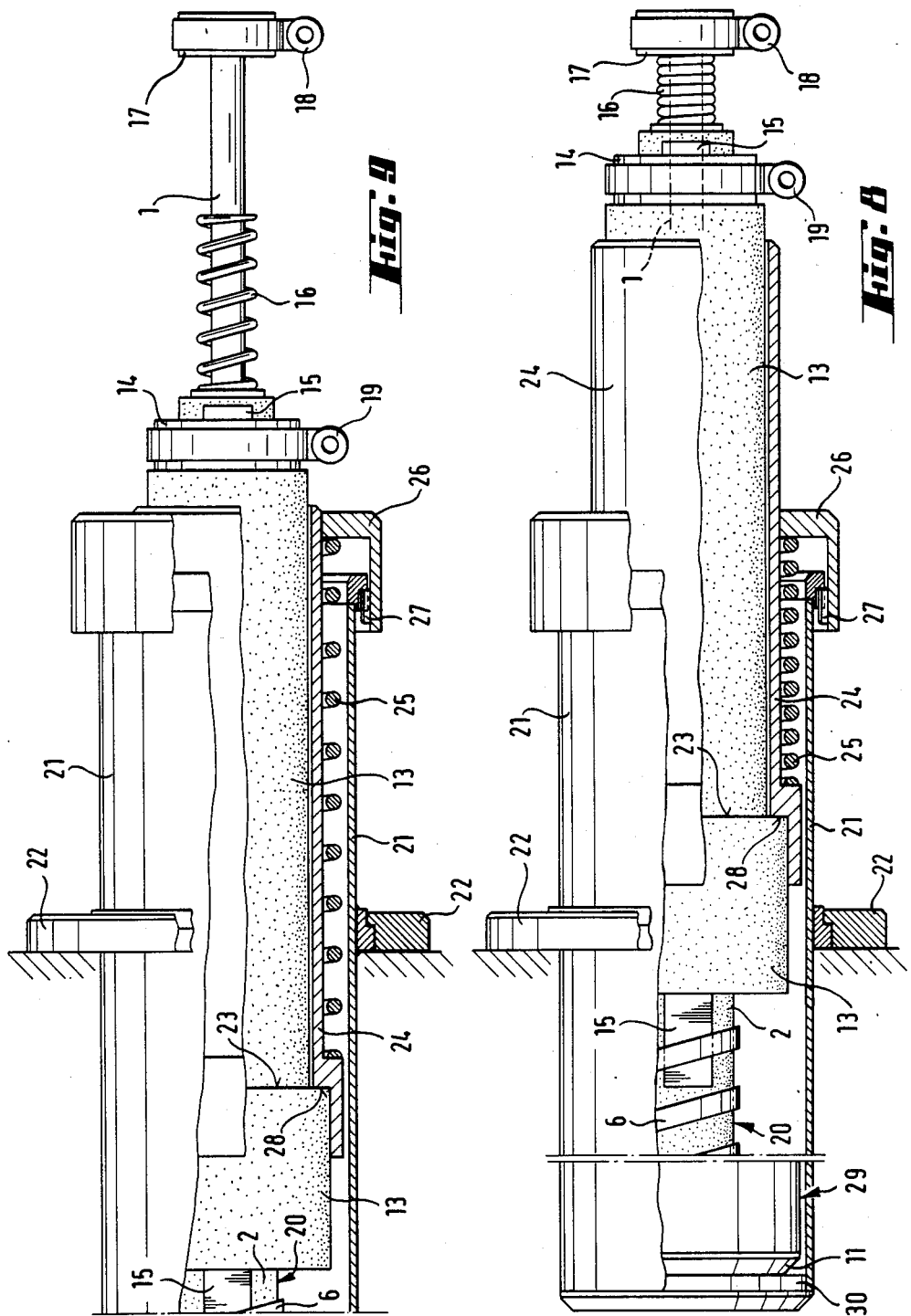

RESISTOR ELEMENT ASSEMBLY FOR A HEATING FURNACE OF GLASS SHEETS AND METHOD OF REPLACING A RESISTOR ELEMENT

FIELD OF THE INVENTION

The present invention relates to a resistor element assembly for a glass sheet heating furnace. The invention relates also to a method of replacing the resistor elements.

BACKGROUND OF THE INVENTION

In a glass sheet heating furnace, relatively long resistor elements are subjected to major temperature variations. Thus, the length variations caused by thermal expansion are also substantial. Another problem is that the resistor element assembly is partly made of ceramics and partly of metal, i.e. it is made of materials whose coefficients of thermal expansion differ a lot from each other. In order to handle these problems and to maintain the length of resistor elements reasonable, the present glass sheet tempering furnaces have grouped the resistor elements in separate arrays of resistors in the lengthwise direction of a furnace. An essential drawback in this solution is that the replacement of resistors requires a lot of labor and long down-times. However, resistors need be replaced quite often, e.g. for setting heating effect (total output, output distribution) and in resistor breakdowns. With present structures and assemblies, resistors are susceptible to damage since it has not been possible to sufficiently eliminate the axial movement between resistance wire coils and ceramic elements. A metal frame having a high coefficient of thermal expansion sets the ceramic elements, whose co-efficient of thermal expansion is lower, in uncontrolable axial movement which in time leads to build-up of resistance wire coils.

In terms of the design and operation of a furnace it would be preferable to make the overhead resistors suspended from the ceiling of a furnace and the bottom resistors mounted on the floor of a furnace mutually exchangeable. With present resistor element assemblies, they are not exchangeable due to the different method of supporting and mounting the resistor elements.

OBJECTS AND SUMMARY OF THE INVENTION

An object of the invention is to overcome the above drawbacks and to provide a resistor element assembly that facilitates ready replacement of resistor elements even during the production without stopping the furnace so as to eliminate long down-times and production setbacks.

A second object of the invention is to provide such a modular assembly that same components can be used to assemble resistor elements of various lengths.

A third object of the invention is to provide a resistor element assembly, wherein the overhead and bottom resistance elements of a furnace can be exchangeable with each other.

These objects are achieved according to the invention by installing between one end of a support frame and the corresponding end of a resistor element a tensioned spring that compresses a resistor element at all operating temperatures against a limit stop at the other end of a support frame. This way the resistor element itself is always axially compressed although the variations in the length of its support frame are substantially greater than variations in the length of a resistor element.

A resistor element assembly according to the present invention comprises an elongated resistor element including elongated ceramic elements mounted successively in a longitudinal direction, a resistance wire wound around the ceramic elements, ceramic spacer blocks between the ceramic elements, the diameter of the blocks exceeding that of the resistance wire coils, and a support frame for carrying the resistor element so that it rests on the spacer blocks.

In a preferred embodiment of the invention, the ceramic elements are tubular and through the entire resistor element is passed a central pin whose one end protrudes from the spring-fitted end of the assembly and the other end is secured to the opposite end of a resistor element. This embodiment facilitates the inventive method, whereby even quite long resistor elements can be replaced in a simple manner and without damaging the elements. In the method of the invention, said spring is released from a support frame and a resistor element is pulled out by means of a central pin, the ceramic elements remaining subjected to compression stress thus avoiding damage.

Anyway, the basic idea in the assembly of the invention is to make sure that ceramic elements remain subjected to compression stress during all steps of handling. As known in the art, the compression strength of ceramic elements is clearly superior to its tensile strength.

In order to securely maintain the resistor elements subjected to compression stress also during transportation and installation, between the protruding end of a central pin and the ceramic end member of a resistor element is fitted another spring which, in the unheated state of resistor element, is available for keeping a resistor element compressed through the tensile stress of a central pin.

BRIEF DESCRIPTION OF THE DRAWING

One embodiment of the invention will now be described in more detail with reference made to the accompanying drawings, in which FIG. 1 is a side view of a resistor element of the invention.

FIG. 2 is an enlarged section of detail II in FIG. 1.

FIG. 3 is an enlarged section of detail III in FIG. 1.

FIG. 4 is a section along IV—IV in FIG. 3.

FIG. 5 is an enlarged section of detail V in FIG. 1.

FIG. 6 is an enlargement of detail VI in FIG. 1.

FIG. 7 is a section along line VII—VII in FIG. 6.

FIG. 8 shows a resistor element assembly of the invention in side view and cut away below the center axis. The relative position of components illustrates the unheated state of a resistor element assembly.

FIG. 9 shows the same as FIG. 8 except that the components have shifted to a position illustrating the heated state of a resistor element assembly.

DETAILED DESCRIPTION OF THE PREFERRED EMBODIMENT

The construction of a resistor element is described by referring to FIGS. 1–7. A resistor element consists of ceramic tubes 2 around which is wound a resistance wire 6 that can be either circular or rectangular in cross-section. The ceramic tubes 2 are supported by a core pin 1 resting on spacer blocks 4, said pin being inserted in ceramic tubes 2 and spacer blocks 4 and extending through a resistor element 20 shown in FIG. 1 from end to end. The diameter of ceramic spacer blocks 4 between ceramic tubes 2 exceeds that of the coils formed by resistance wire 6. Fitted between the ends of tubes 2 and spacer blocks 4 are pads 3 for avoiding spot-like compression loads. Spacer 4 is covered with a protective shell 7. Another padding 5 is fitted between protective shell 7 and block 4. Resistance wires 6 are linked to each other by means of a separate connecting bar 12 shown in FIG. 4 e.g. by welding the wire ends to the connecting bar. In addition, the other end of resistance wire 6 is fastened to core pin 1 e.g. by welding (FIG. 2). At the junction, the end of core pin 1 is fitted with a coupling member 8 which is closed between ceramic members 4' and 9. The end block is generally designated with reference numeral 29 and covered with protective shell 7 and sealed with an end plate 11. Here, also, the ceramic members are protected with paddings 5 and 10.

One end of resistance wire 6 is fitted with a flat bar 15 passing through a hole 15a in said ceramic end member 13 (FIGS. 5-7). Accordingly, core pin 1 extends through a center hole 1a, made in said ceramic end member 13 at a distance from said other hole 15a. Flat bar 15 and core pin 1 provide galvanic coupling at the opposite ends of resistance wire 6. One end of flat bar 15 is fitted with a coupling ring 14. The other end of core pin 1 is fitted with a coupling member 17. The resistor element is temporarily compressed by means of a spring 16 which leans against said ceramic end member 13 and produces by way of the tensile stress of core pin 1 a counterforce at one end of element 20 (see coupling 8). By virtue of this, the resistor element remains assembled and the ceramic elements subjected to compression stress during the transportation and installation of a resistor element.

The above-described resistor element 20 can be inserted as a continuous long element in a support frame 21 which can be a thin-walled tube or a massive resistor body. The shape of a support frame can be e.g. trough-like. A support frame 21 can also be made of a plurality of successively placed frame members. What is essential is that said support frame 21 provides a resistor element 20 supporting surface on which said resistor element 20 can rest through the action of spacer blocks 4.

As shown in FIG. 8, a spring 25 compresses resistor element 20 so that the end member 29 of said resistor element 20 leans against a limit stop 30 at the end of support frame 21. Said spring 25 surrounds a sleeve-shaped member 24 whose shoulder 28 leans against a shoulder 23 of said ceramic end member 13. A removable coupling 27 is used to fasten a lid 26 to the end of support frame 21. Spring 25 is in compressed state between shoulder 28 and lid 26.

Said support frame 21 is provided with an attachment flange 22 for fastening a resistor element assembly to the wall of a furnace, the section remaining on the right-hand side of flange 22 will be outside the heat insulation of a furnace. The left-hand section extends over a desired distance, preferably over a distance corresponding to the entire length of a furnace (considering the necessary thermal expansion).

The purpose of spring 25 is to hold the resistor element assembly together as an integral unit, both unheated and heated. FIG. 8 shows a resistor element assembly in unheated state and FIG. 9 illustrates the same assembly in heated state (at operating temperature). The length of support frame 21 has now increased considerably. The length of resistor element 20 has also increased but considerably less than the length of frame 21. Through the action of spring 25, the entire resistor element 20 has shifted to the left over a distance corresponding to said difference in lengths. Considering the temperature and material selections, said core pin 1 may extend its length approximately the same distance as support frame 21 extends. This is why the outer end of core pin 1 stays substantially in the same position as with the assembly unheated, since the internal end of a furnace shifts over a distance corresponding to the increase in length. It will be noted that the relative shifting between components takes place between the protective shells 7 of said ceramic spacer blocks and support frame 21. The surfaces of these components can be selected to be very easily slidable and resistant to abrasion.

The coupling ring 14 is fitted with a cable shoe 19 and the coupling member 17 is fitted with a cable shoe 18. However, electric current to the other end of the resistance wire can be supplied from the opposite end of a furnace, so the galvanic coupling provided by pin 1 is not absolutely necessary in this respect.

The resistance wires may have different outputs and their output distribution may vay in the longitudinal direction of a resistor element.

A resistor element can be replaced in a simple manner, even in the heated state of a furnace, by removing lid 26 from its connection 27 and by pulling the entire resistor element out of support frame 21 by means of traction applied to core pin 1. Thus, during the extraction, a resistor element is subjected to compression stress. Following the cool-down and retraction of pin 1 said spring 16 will hold a resistor element in the compressed state, whereafter the element can be shifted and handled.

It is obvious that the above embodiment shown in the drawings is but one way of practicing the invention. Structural details can be readily modified by a skilled person without departing from the basic idea of the invention as set forth in the annexed claims.

I claim:

1. A resistor element assembly for a heating furnace of glass sheets, comprising:
   an elongated resistor element extending in a longitudinal direction and having a first end and a second end, said resistor element including
   a plurality of elongated ceramic elements positioned successively in said longitudinal direction,
   a resistance wire wound into wire coils around said ceramic elements, said wire coils having a diameter, and
   a plurality of ceramic spacer blocks positioned between said ceramic elements, said blocks having a diameter exceeding said diameter of said wire coils,
   a support frame having a first end, a second end and a limit stop at said second end, said support frame carrying said resistor element by providing a resting surface for said spacer blocks, and
   a first spring positioned between said first end of said resistor element and said first end of said support frame for compressing said resistor element at all operating temperatures against said limit stop at said second end of said support frame, said elongated resistor element further including means for urging said plurality of elongated ceramic elements and said spacer blocks toward one another in said longitudinal direction at least when said resistor element is not being carried in said support frame.

2. A resistor element assembly as set forth in claim 1, wherein said ceramic elements are tubular and said resistor element further includes a core pin having a first end and a second end and extending through the entire length of said resistor element, said first end of said core pin protruding from said first end of said support frame and said second end being securely fastened to said second end of said resistor element.

3. A resistor element assembly as set forth in claim 2, wherein said resistor element further includes a ceramic end member fixed to said first end of said resistor element, said means for urging includes a second spring positioned between said first end of said core pin and said ceramic end member for urging and holding said resistor element together in an unheated state of the resistor element through the tensile stress of said core pin.

4. A resistor element assembly as set forth in claim 1 further comprising:

a sleeve-shaped member having a shoulder and being positioned adjacent said first end of said resistor element, and a removable lid fitted on said first end of said support frame, said first spring surrounding said sleeve-shaped member and being positioned to lean at a first end on said removable lid and at a second end on said shoulder.

5. A resistor element assembly as set forth in claim 1 wherein said resistor element has a length which substantially matches the length of the heating furnace.

6. A method of replacing a resistor element in the resistor element assembly set forth in claim 5, comprising the steps of;

releasing said first spring from said support frame, and pulling said resistor element from the heating furnace by applying traction to said core pin of said resistor element such that said elongated ceramic elements, said resistance wire, and said ceramic spacer blocks remain subjected to compression stress during removal of the resistor element.

* * * * *